(12) United States Patent
Knopp

(10) Patent No.: US 9,348,750 B1
(45) Date of Patent: May 24, 2016

(54) CIRCUIT FOR AND METHOD OF REALIGNING DATA AT A RECEIVER

(75) Inventor: Tomai Knopp, Bernalillo, NM (US)

(73) Assignee: XILINX, INC., San Jose, CA (US)

( * ) Notice: Subject to any disclaimer, the term of this patent is extended or adjusted under 35 U.S.C. 154(b) by 1578 days.

(21) Appl. No.: 11/639,480

(22) Filed: Dec. 14, 2006

(51) Int. Cl.
G06F 12/02 (2006.01)
G06F 12/04 (2006.01)
G06F 5/01 (2006.01)

(52) U.S. Cl.
CPC . *G06F 12/04* (2013.01); *G06F 5/01* (2013.01)

(58) Field of Classification Search
CPC ........................................... G06F 12/04
USPC ............................. 710/62; 711/118
See application file for complete search history.

(56) References Cited

U.S. PATENT DOCUMENTS

| | | | | |
|---|---|---|---|---|
| 5,517,627 A | * | 5/1996 | Petersen | 710/316 |
| 5,638,533 A | * | 6/1997 | Law | 711/157 |
| 5,774,697 A | * | 6/1998 | Hall | 711/141 |
| 5,974,516 A | * | 10/1999 | Qureshi | 711/171 |
| 6,522,581 B2 | * | 2/2003 | Takata et al. | 365/185.05 |
| 6,556,495 B2 | * | 4/2003 | Condorelli et al. | 365/221 |
| 2006/0083204 A1 | * | 4/2006 | Belaiche | 370/335 |
| 2006/0120622 A1 | * | 6/2006 | Dwyer et al. | 382/281 |

OTHER PUBLICATIONS

Xilinx, Inc.; U.S. Appl. No. 10/800,367, filed Mar. 12, 2004 by Thorpe et al.

* cited by examiner

*Primary Examiner* — Henry Tsai
*Assistant Examiner* — John Roche
(74) *Attorney, Agent, or Firm* — John J. King

(57) ABSTRACT

A circuit for realigning data received at a receiver is disclosed. The circuit comprises a plurality of memory arrays; a plurality of multiplexers, wherein each multiplexer is coupled to select an address for data to be output by a memory array of the plurality of memory arrays; an output multiplexer coupled to select the outputs of the plurality of memory arrays; and a memory control circuit coupled to the plurality of multiplexers and the output multiplexer, the memory control circuit coupling select signals to the plurality of multiplexers and the output multiplexer to enable generating realigned data. A method of realigning data received at a receiver is also disclosed.

20 Claims, 10 Drawing Sheets

| case in | be | case out | pre mux | post mux | increment |
| --- | --- | --- | --- | --- | --- |
| 0 | 1111 | 0 | 0000 | 0 | 1 |
| 0 | 0111 | 1 | 0000 | 3 | 1 |
| 0 | 1110 | 1 | 0000 | 3 | 1 |
| 0 | 0011 | 2 | 0000 | 2 | 1 |
| 0 | 0110 | 2 | 0000 | 2 | 1 |
| 0 | 1100 | 2 | 0000 | 2 | 1 |
| 0 | 0001 | 3 | 0000 | 1 | 1 |
| 0 | 1000 | 3 | 0000 | 1 | 1 |
| 0 | 0100 | 3 | 0000 | 1 | 1 |
| 0 | 0010 | 3 | 0000 | 1 | 1 |
| 0 | 0001 | 3 | 0000 | 1 | 1 |
| 1 | 1111 | 1 | 0001 | 3 | 1 |
| 1 | 1110 | 2 | 0001 | 3 | 1 |
| 1 | 1100 | 3 | 0001 | 3 | 1 |
| 1 | 1000 | 0 | 0001 | 3 | 0 |
| 2 | 1111 | 2 | 0011 | 2 | 1 |
| 2 | 1110 | 3 | 0011 | 2 | 1 |
| 2 | 1100 | 0 | 0011 | 2 | 0 |
| 2 | 1000 | 1 | 0011 | 2 | 0 |
| 3 | 1111 | 3 | 0111 | 1 | 1 |
| 3 | 1110 | 0 | 0111 | 1 | 0 |
| 3 | 1100 | 1 | 0111 | 1 | 0 |
| 3 | 1000 | 2 | 0111 | 1 | 0 |

FIG. 9

CIRCUIT FOR AND METHOD OF REALIGNING DATA AT A RECEIVER

FIELD OF THE INVENTION

The present invention relates generally to data receivers, and in particular, to a circuit for and method of realigning data received at a receiver.

BACKGROUND OF THE INVENTION

Integrated circuits are an integral part of virtually any electronic device. A variety of integrated circuits are often used together to enable the operation of the electronic device. While integrated circuits are typically designed for a particular application, one type of integrated circuit that enables flexibility is a programmable logic device. A programmable logic device (PLD) is designed to be user-programmable so that users may implement logic designs of their choices. One type of PLD is the Complex Programmable Logic Device (CPLD). A CPLD includes two or more "function blocks" having a two-level AND/OR structure connected together and to input/output (I/O) resources by an interconnect switch matrix. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell.

A programmable logic device may be used in a wide variety of applications that are implemented with a variety of operating systems. Accordingly, the operation of the programmable logic device may vary depending upon the operating system. One common use for programmable logic devices is in the transmission of data. For most data transfers in a system employing a microprocessor, bursting of data in the native bus data width of the microprocessor is the most efficient mechanism for transmitting data. Data that is part of a burst transfer, such as data transferred by direct memory access (DMA) devices, is generally transferred in ascending address order. Valid data bytes are adjacent to each other during any transfer cycle such that no invalid data bytes are included between valid data bytes. A transfer cycle is either a single data beat transaction or a single burst transaction comprised of multiple data beats.

DMA transfers performed in hardware as part of a microprocessor system are often inefficient when the source and destination data buffers are not address aligned to the native data width of the microprocessor data bus. The problem of mis-aligned data buffers is often encountered when off-the-shelf operating systems, such as MontaVista Linux by Montavista Software or VxWorks 5.x by Wind River, are used. These operating systems, while popular with microprocessor system implementers, generally do not allow the end user to specify data buffer alignment within a system implementation. Accordingly, the data must be realigned by the user. This data realignment may be performed in a number of ways. For example, the realignment may require the user to include additional programming to detect when a data buffer is not aligned, and then employ the microprocessor to copy the unaligned buffer to an aligned buffer prior to initiating a DMA transfer of that buffer. Alternatively, a DMA device may transfer data in bit widths that are less than the microprocessor data bus width but are guaranteed to meet all possible buffer alignments.

However, many applications for receiving data require that data that is transmitted as aligned data be realigned by the receiver to correspond to the original unaligned data. In order to realign the data, conventional devices require buffer copies maintained by the processor, and therefore reduce system performance. That is, the DMA device would have to transfer data into a word aligned memory, and then signal the processor to copy that aligned data to an unaligned final destination. Such a requirement to transfer data into a word aligned memory significantly minimizes overall system performance by occupying the processor with a low-level task.

Accordingly, there is a need for an improved circuit for and method of realigning data by a receiver in a data communication system.

SUMMARY OF THE INVENTION

A circuit for realigning data received at a receiver is disclosed. The circuit comprises a plurality of memory arrays; a plurality of multiplexers, wherein each multiplexer is coupled to select an address for data to be output by a memory array of the plurality of memory arrays; an output multiplexer coupled to select the outputs of the plurality of memory arrays; and a memory control circuit coupled to the plurality of multiplexers and the output multiplexer, the memory control circuit coupling select signals to the plurality of multiplexers and the output multiplexer to enable generating realigned data. The circuit may further comprise a random access memory storing aligned data to be transferred to the plurality of memory arrays and output as realigned data, wherein each memory array of the plurality of memory arrays comprises a shift register of a programmable logic device.

According to an alternate embodiment, a circuit for realigning data received at a receiver comprises a first memory array storing an aligned data stream; a plurality of memory arrays coupled to the first memory array, wherein each memory array of the plurality of memory arrays comprises a shift register and is coupled to receive a current address or a previous address; a plurality of multiplexers, wherein each multiplexer is coupled to select the current address or the previous address for data to be output by a memory array of the plurality of memory arrays; an output multiplexer coupled to select outputs of the plurality of memory arrays; and a memory control circuit coupled to the plurality of multiplexers and the output multiplexer, the memory control circuit coupling select signals to the plurality of multiplexers and the output multiplexer to enable generating an output comprising realigned data of the aligned data stream. The circuit may comprise a programmable logic device, wherein the first memory array may comprise a random access memory and the plurality of memory arrays may comprise a shift register of a programmable logic device.

A method of realigning data received at a receiver is also disclosed. The method comprises receiving aligned data; storing the aligned data in a plurality of memory arrays corresponding to a plurality of byte lanes; selecting a byte of data associated with a current address or a previous address for each byte lane; selecting a byte lane for each byte of an output word; and generating the output word comprising the unaligned data. The method may further comprise generating a selection signal for selecting the current address or a previous address for each byte of the output word. Selecting a byte associated with a current address or a previous address for each byte of an output word may comprise programming a programmable logic device with a multiplexer enabling the selection of the current address or the previous address for each byte lane. Finally, selecting a byte lane for each byte of an output word may comprise programming a programmable logic device with a multiplexer enabling the selection of a byte lane for each byte of an output word.

BRIEF DESCRIPTION OF THE DRAWINGS

FIG. 9 is an exemplary table showing the operation of a state machine for generating unaligned data according to an embodiment of the present invention;

DETAILED DESCRIPTION OF THE DRAWINGS

Figure 1:
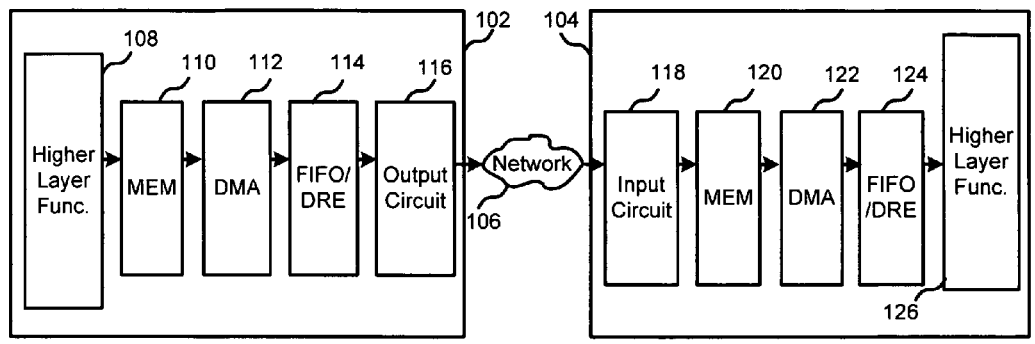
FIG. 1 is a block diagram of a system for transmitting data according to an embodiment of the present invention.

Turning first to FIG. 1, a block diagram of a system for transmitting data according to an embodiment of the present invention is shown. In particular, a transmitter circuit 102, which may comprise, for example, a programmable logic device or an ASIC having programmable logic, is coupled to a receiver circuit 104 by way of a network 106. The receiver circuit may also comprise a programmable logic device, for example, while the network may comprise any type of wired or wireless network for transmitting and receiving data. The transmitter circuit 102 employs a high layer function block 108 comprising an application that generates unaligned data. The data is stored in a memory 110 and may be accessed by direct memory access (DMA) device 112. A combined first in/first out (FIFO) memory and data realignment engine (DRE) 114 provides the aligned data to an output circuit 116, which may comprise an Ethernet core that couples data to an Ethernet link, for example. The data may be aligned in the FIFO/DRE 114 as described in U.S. application Ser. No. 10/800,367 entitled "CIRCUIT FOR AND METHOD OF REALIGNING DATA" and filed on Mar. 12, 2004 by the Assignee of the present application, the entire application of which is incorporated by reference.

The receiver circuit 104 receives data from the transmitter circuit 102 by way of the network 106 at an input circuit 118, which may comprise a receiver for Ethernet data, for example. The data is coupled to a memory (MEM) 120, which may be accessed by a direct memory access (DMA) circuit 122 or some other circuit such as a processor, as is well known in the art. As will be described in more detail below in reference to FIGS. 2-12, a FIFO dynamic realignment engine (DRE) 124 realigns the data, and provides the realigned data to a higher layer function 126, such as an application requiring the data in an unaligned format. While an Ethernet application will be described below by way of example, any network protocol may be employed according to the present invention.

Figure 2:
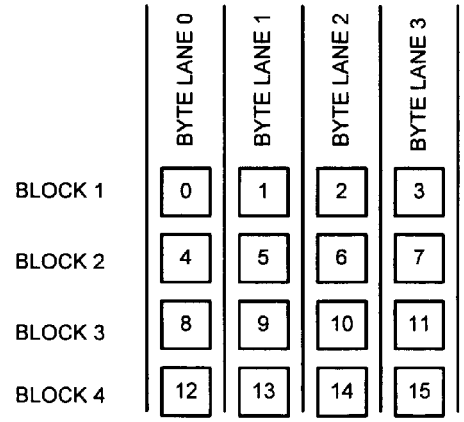
FIG. 2 is a diagram showing aligned data transmitted in a system for transmitting data according to an embodiment of the present invention.
Figure 3:
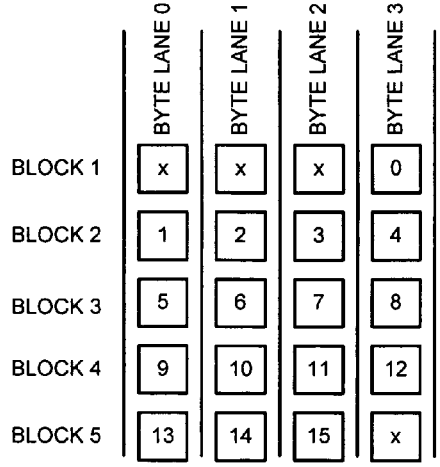
FIG. 3 is a diagram showing unaligned data generated by a receiver according to an embodiment of the present invention.

Turning now to FIGS. 2 and 3, aligned data transmitted to a receiver and unaligned data generated by a receiver are shown. The data is shown arranged in memory arrays configured as byte lanes by way of example and used to describe the operation of the various circuits set forth below. A byte comprising 8 bits is generally the smallest addressable data element in a microprocessor system. Accordingly, the exemplary diagrams of FIGS. 2 and 3 show data in a 32-bit wide data bus having four 8-bit byte lanes. A DMA data transfer in a microprocessor system requires data to be read from a source address and written to a destination address. In this example, the data bus is capable of transferring 4 bytes of data in a single transfer cycle, where the four byte lanes are arranged in parallel to form the 32-bit wide data bus. These transfers are either a single data beat or a string of data beats (i.e., a burst transfer).

FIG. 2 shows aligned data in a 32-bit wide data bus. When either the starting source address or the starting destination address (or both) do not match with the natural address partitioning boundary of a full width of the data bus, the transfer is unaligned, as shown for example in FIG. 3, where the data is offset by one byte. The application receiving the data will determine the proper alignment of the data, such as the alignment shown in FIG. 3, when the data is transmitted as aligned data but required by the application receiving the data to be unaligned. That is, the data realignment engine 124 generates unaligned data from the aligned data, as will be described in more detail below.

Figure 4:
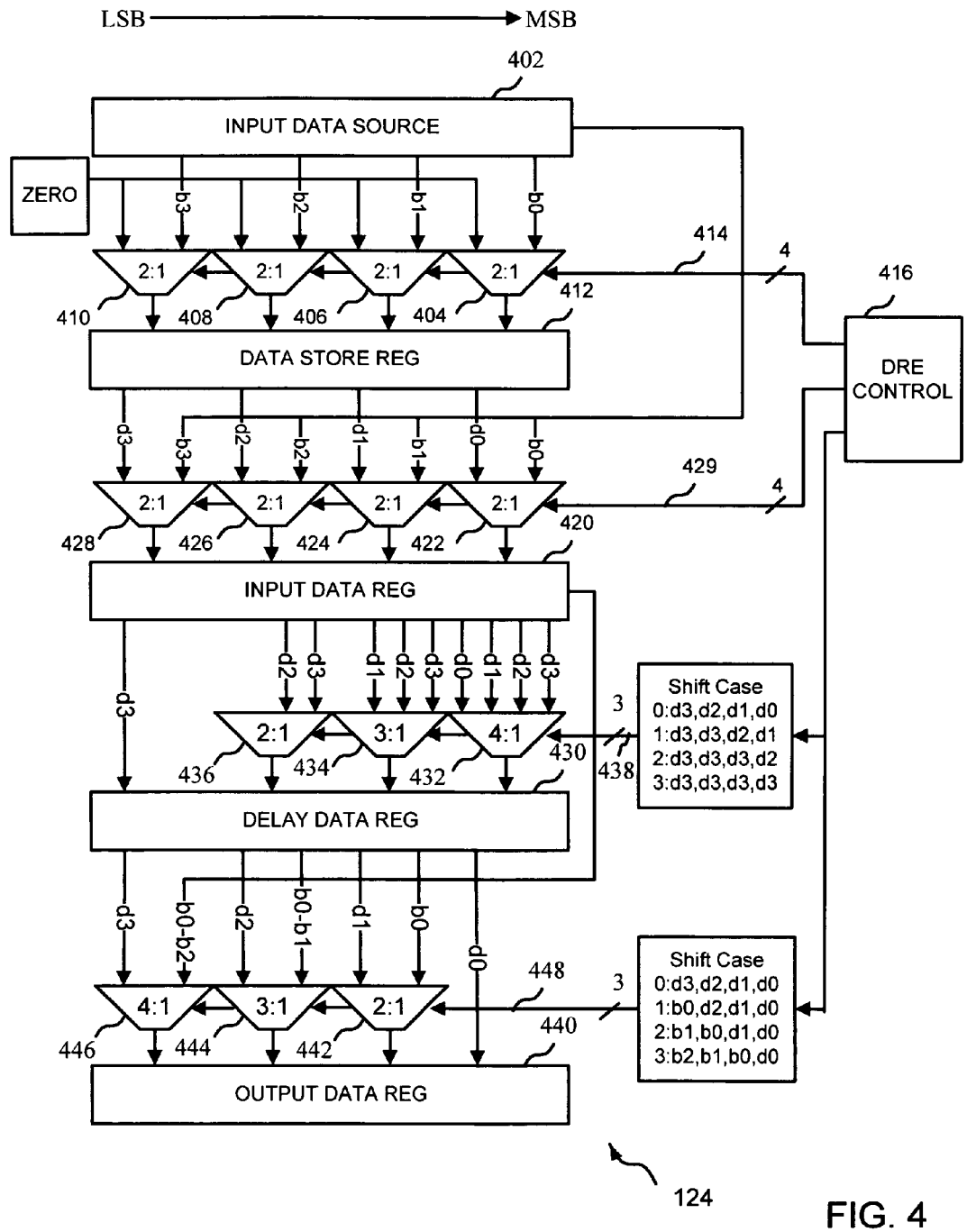
FIG. 4 is a block diagram of a circuit for generating unaligned data according to an embodiment of the present invention.

Turning now to FIG. 4, a block diagram of a circuit for generating unaligned data according to an embodiment of the present invention is shown. In particular, data from an input data source 402 is coupled to provide bytes b0 to b3 of the four byte lanes to four corresponding multiplexers 404-410, each of which is also coupled to receive a zero at a second input. The data in the various registers are shown extending from the least significant byte (LSB) corresponding to b3 of a byte lane 3 to the most significant byte (MSB) corresponding to b0 of a byte lane 0. The selection of a zero or a byte from the input data source 402 for each of the multiplexers 404-410 is determined by a multiplexer selection signal 414 from a data realignment engine (DRE) control circuit 416. Data from the input data source may also be provided to an input data register 420 by way of a second plurality of multiplexers 422-428. Each of the multiplexers 422-428 may select a byte from the data storage register 420 or byte from the input data source 412. In particular, the first multiplexer 422 is coupled to receive either d0 from the data store register 412 or b0 from the input data source 402. Similarly, the second multiplexer 424 is coupled to receive either d1 from the data store register or b1 from the input data source. Further, the third multiplexer 426 is coupled to receive either d2 from the data store register or b2 from the input data source. Finally, the fourth multiplexer 428 is coupled to receive either d3 from the data store register or b3 from the input data source.

At the beginning of a cycle, the input data register (420) is populated with the contents of the Data Store register (412). If this is the first cycle, then the data store register contains zeros. If this is a subsequent transfer, then the data store register holds the previous input data source. The selection of signals coupled to the input data register is controlled by the control signals 429 from the DRE control circuit 416. While the input data source and the data store register are provided before the input data register which feeds the correct data to the output data block, the dynamic realignment occurs between the input data register and the output data register. In particular, when the correct data is loaded into the input data register, the data is selected for a delay data register 430. A multiplexer 432 is coupled to select one of d0-d3 for a most significant byte of the delay data register. A multiplexer 434 is coupled to select one of d1-d3 for the second most significant byte. A multiplexer 436 is coupled to receive one of d2 or d3. Finally, d3 is provided directly for the least significant byte. The selection signals 438 coupled to the multiplexers 432-436 are determined based upon a shift case as shown. That is, the inputs to the multiplexers are selected based upon how many bytes must be shifted to obtain the correct realignment of the output data.

Multiplexers 442-446 are then used to select an output of the input data register 420 or the delay data register 430. While d0 is provided as the most significant byte, a multiplexer 442 is coupled to receive one of the output b0 from the input data register or d1 from the delay data register. Similarly, a multiplexer 444 is coupled to receive one of the outputs b0 or b1 from the input data register or d2 from the delay data register. Finally, a multiplexer 446 is coupled to receive one of the outputs b0-b2 from the input data register or d3 from the delay data register. The selection signals 448 coupled to the multiplexers 442-446 are also determined based upon the number of bytes that are shifted.

In the example of FIGS. 2 and 3, which relates to shift case 1, multiplexer 432 would select d1, multiplexer 434 would select d2, multiplexer 436 would select d3, and d3 would be transferred as the least significant byte from the input data register to the delay data register. Similarly, d0 would be transferred from the delay data register to the output data register as the most significant byte. Multiplexer 442 would select d1, multiplexer 444 would select d2, and multiplexer 446 would select b0. As will be described in more detail in reference to FIG. 5, the first word written to the output data register would comprise the word "1230." An example of a realignment of data showing the storage of data in the various registers will be described in more detail in reference to FIG. 5.

Figure 5:
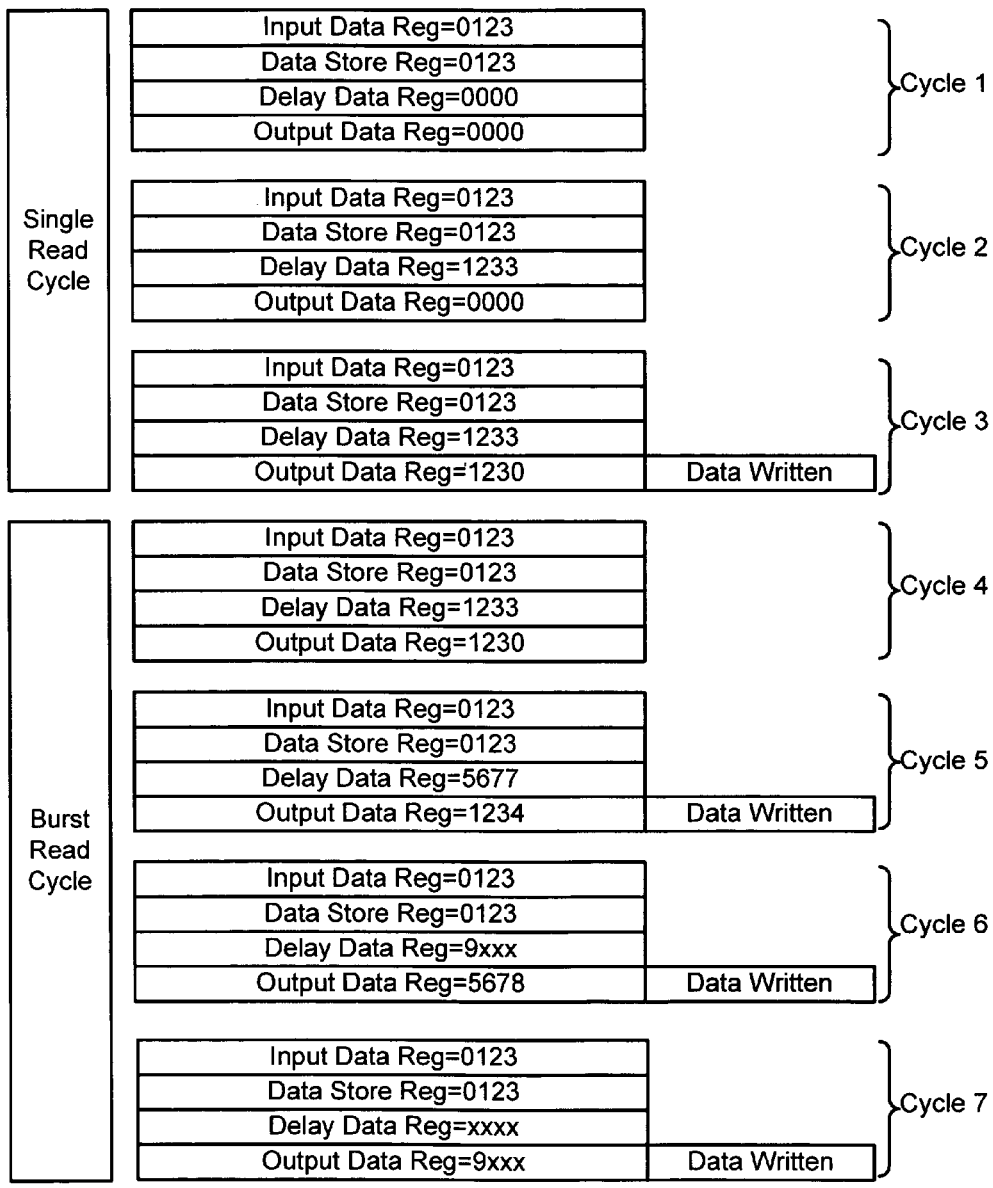
FIG. 5 is a block diagram showing the operation of the circuit of FIG. 4 according to an embodiment of the present invention.

Turning now to FIG. 5, a block diagram shows the operation of the circuit of FIG. 4 realigning bytes 0-9 according to FIGS. 2 and 3. In particular, the example of FIG. 5 relates to the shift of three bytes, corresponding to the transition of three bytes in the example of FIGS. 2 and 3 using the circuit of FIG. 4. The example of FIG. 5 shows a single read cycle followed by a burst read cycle. Three clock cycles are required to output the first data word. In particular, in cycle 1, the data store register stores bytes 0123 comprising aligned bytes. The input data register also stores 0123. The delay data register and the output data register comprise all zeros in cycle 1 because no data has yet been transferred to those registers. In cycle 2, the data store register and the input data register still store 0123, while the delay data register stores 1233. The data in the output data register still retains all zeros. In cycle 3, the output data register now stores 1230. Because the only relevant byte is the least significant byte (byte 0 in this case), the least significant byte of the output data word will comprise byte 0, as shown in FIG. 3, and the remaining bytes are "don't cares."

The burst read cycles are now described in reference to cycles 4-7. In cycle 4, the second word of aligned data comprising bytes 4-7 is loaded into the data store register and the input data register. As can be seen in cycle 5, bytes 8 and 9 are loaded into the data store register and the input data register, while bytes 1, 2, 3 and 4 are transferred to the output data register according to the shift case 1. The delay data register stores bytes 5, 6, 7 and 7. In cycle 6, no new data is received, while byte 9 is shifted to the delay data register and the output data register stores bytes 5, 6, 7 and 8. That is, bytes 5, 6 and 7 are received from the delay data register while byte 8 is received from the input register. Finally, in cycle 7, byte 9 from the delay register is shifted to the output data register to complete the burst read cycle.

Figure 6:
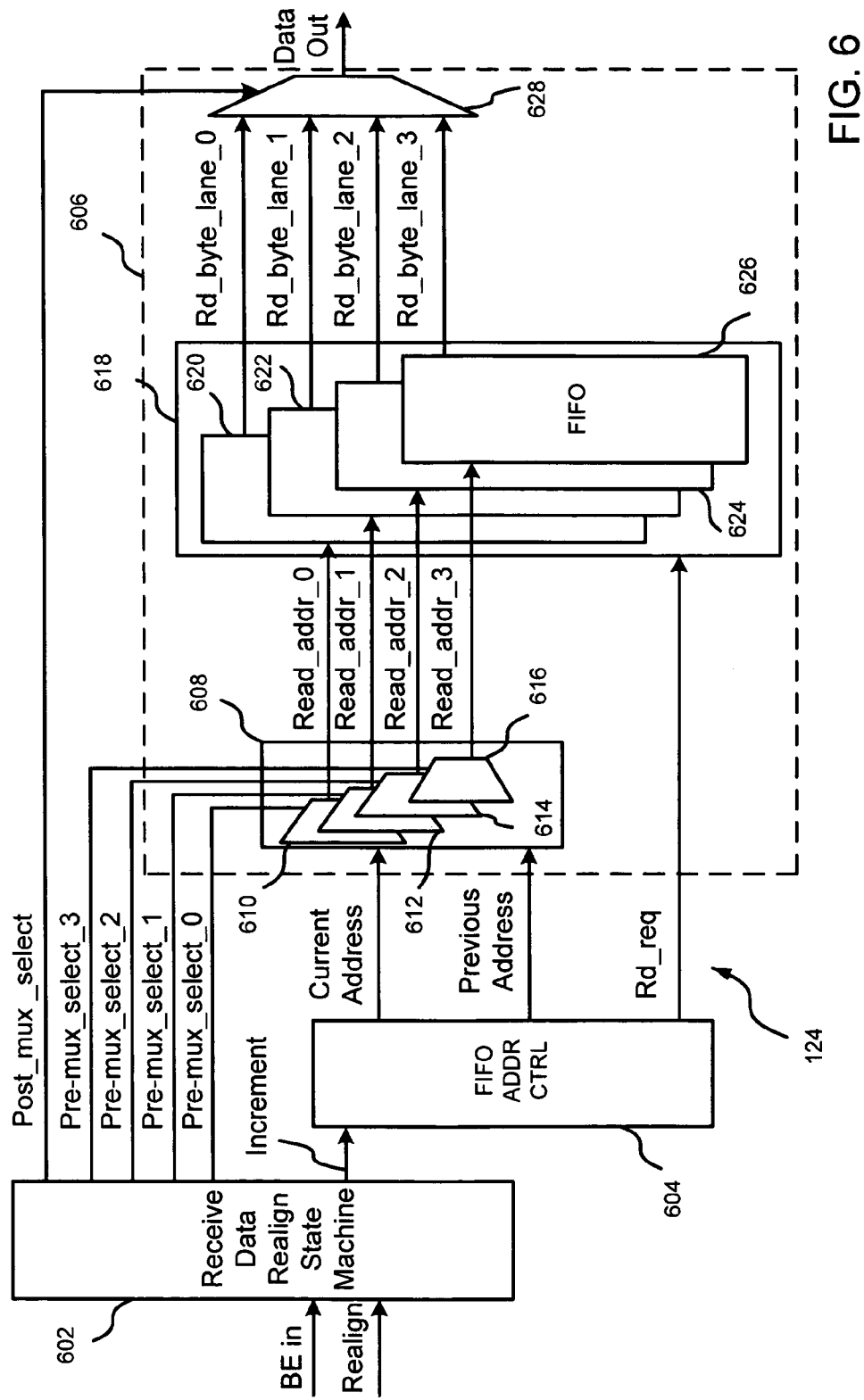
FIG. 6 is a block diagram of a circuit for generating unaligned data according to an alternate embodiment of the present invention.

Turning now to FIG. 6, a block diagram of a circuit for generating unaligned data according to an alternate embodiment of the present invention is shown. In particular, a receive data align state machine 602 comprises a memory control circuit that receives a byte enable (BE in) signal and a realignment (Realign) signal, and couples an increment signal to a FIFO address controller to start the realignment of data to generate the realigned data. The operation of the receive data realignment state machine 602 will be described in more detail in reference to FIG. 9. The FIFO address controller 604 couples a current address and a previous address to a plurality of multiplexers 608. In the exemplary circuit of FIG. 6, multiplexers 610-616 provide one multiplexer for each of the four byte lanes. The receive data realign state machine couples select signals to the multiplexers. In particular, multiplexer 610 receives a Pre-mux_select_0 signal to select either the current address or previous address provided by the FIFO address controller 604, and outputs a Read_addr_0 signal to a FIFO block 618 at an input of a FIFO 620. Similarly, multiplexer 612 receives a Pre-mux_select_1 signal to select either the current address or previous address, and outputs a Read_addr_1 to a FIFO 622 of FIFO block 618. Multiplexer 614 receives a Pre-mux_select_2 signal, and outputs a Read_addr_2 to a FIFO 624 of a FIFO block 618. Finally, multiplexer 616 receives a Pre-mux_select_3 signal, and outputs a Read_addr_3 to a FIFO 626 of a FIFO block 618.

As will be described in more detail below, read request (Rd_req) is coupled from the FIFO address controller to the FIFO block 618. The data from the FIFOs 620-626 addressed by the read address signals is selected as byte lane data by an output multiplexer 628 in response to a Post_mux_select signal from the receive data realign state machine 602. The selection of the Post_mux_select signal and the Pre_mux_select signals to enable to appropriate shifting according to a given shift case will be described in more detail in reference to the embodiment of FIG. 8.

Figure 10:
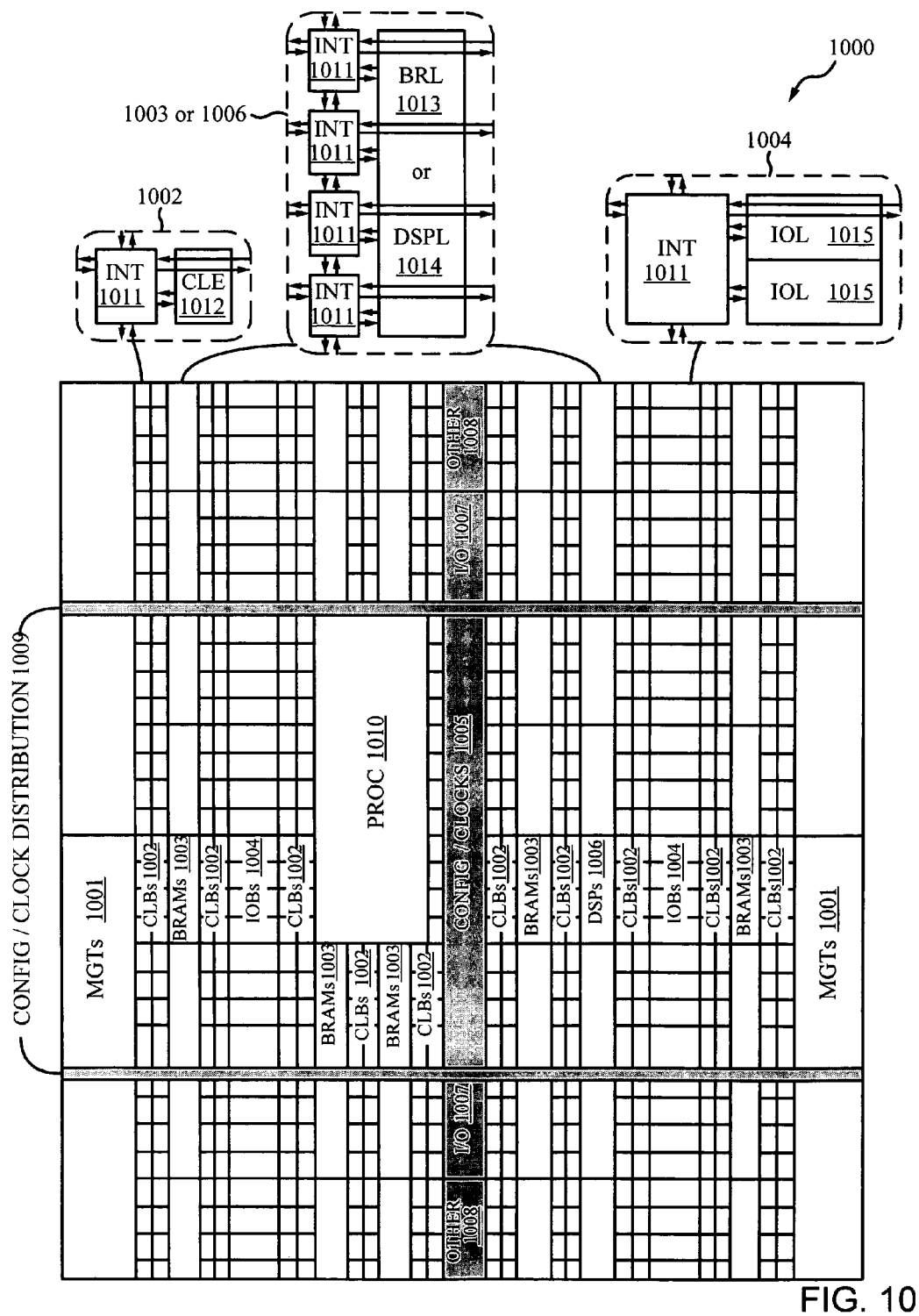
FIG. 10 is a block diagram of a programmable logic device according to an embodiment of the present invention.

Each of the FIFOs 620-626 may be implemented, for example, in a block random access memory (BRAM), such as the BRAMs of the PLD of FIG. 10. Accordingly, a BRAM is dedicated to each byte lane in the main data path. For example, if the data path is 32 bits, there would be a minimum of four BRAMs used in the main data path. The number of BRAMs required would scale linearly for wider data paths. While the use of a byte lane memory reduces design complexity and latency, this requirement may become too restrictive for larger data paths. Accordingly, a secondary memory block may be designated out of distributed memory of a programmable logic device to remove this limitation, as will be described in more detail in reference to the circuit of FIG. 7. Distributed memory of a programmable logic block will be described in more detail in reference to FIG. 10.

Figure 7:
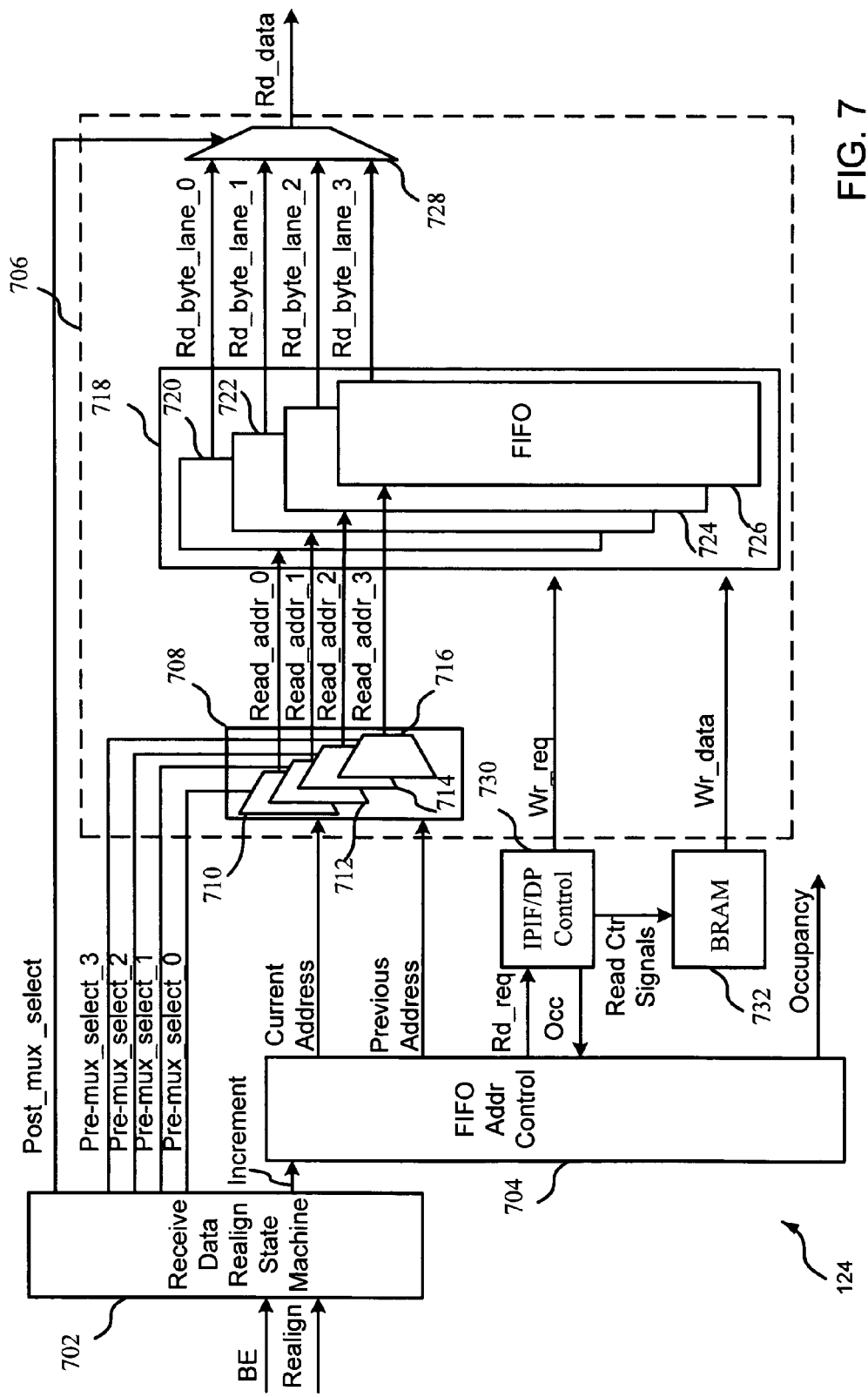
FIG. 7 is a block diagram of a circuit for generating unaligned data according to a further embodiment of the present invention.

Turning now to FIG. 7, a block diagram of a circuit for generating unaligned data according to a further embodiment of the present invention is shown. The circuit of FIG. 7 provides a receive data dynamic realignment engine where there are no limitations placed on the memory. That is, a main memory is optimally configured without regard to byte lanes, while a small FIFO is employed between the read port of the main memory and each output byte lane. The small FIFOs are responsible for providing the byte lanes to the realignment engine. Referring specifically to FIG. 7, a receive data realign state machine 702 receives a byte enable (BE in) signal and a realignment (Realign) signal, and couples an increment signal to a FIFO address controller to start the realignment of data to generate the realigned data. The FIFO address controller 704 couples a current address and a previous address to a plurality of multiplexers. In particular, multiplexers 710-716 provide one multiplexer for each of the four byte lanes. The receive data realign state machine couples select signals to the multiplexers. Multiplexer 710 receives a Pre-mux_select_0 signal to select either the current address or previous address, and outputs a Read_addr_0 to a FIFO block 718 at an input of a FIFO 720. Similarly, multiplexer 712 receives a Pre-mux_select_1 signal, and outputs a Read_addr_1 to a FIFO 722 of FIFO block 718. Multiplexer 714 receives a Pre-mux_select_2 signal, and outputs a Read_addr_2 to a FIFO 724 of a FIFO block 718. Finally, multiplexer 716 receives a Pre-mux_select_3 signal, and outputs a Read_addr_3 to a FIFO 726 of a FIFO block 718.

The data from the FIFOs 720-726 addressed by the read address signals is selected as byte lane data by an output multiplexer 728 in response to a Post_mux_select signal from the receive data align state machine 702. An intellectual property interface (IPIF) and dual port (DP) control circuit 730 receives a read request (Rd_req) signal from the FIFO address controller and provides read control signals to a BRAM 732 comprising a main memory. The IPIF/DP circuit 730 also generates a write request (Wr_req) signal to the FIFO block 708 and an occupancy (Occ) signal to the FIFO address controller. Data from the BRAM 732 is then written in a byte lane order to the FIFOs 720-726. The data may then be read from the FIFOs 720-726 in a byte lane order, as will be described in more detail in reference to FIG. 8.

While the arrangement of FIG. 7 requires additional logic compared to FIG. 6, the circuit reduces the number of BRAMS when employed is a device such as the PLD of FIG. 10. That is, using a configurable logic element to implement FIFOs 720-726 would minimize the number of the byte lane FIFOs which may otherwise be implemented in BRAMs. That is, due to the ability of a single look-up table (LUT) of a configurable logic element (CLE) to act as a dynamically addressable shift register, smaller memory elements may be used to enable the output of data in byte lanes. The use of a CLE as a FIFO also removes the requirement of having a write address pointer, which would be required to output data from a BRAM. A CLE will be described in more detail in reference to FIG. 11.

Figure 8:
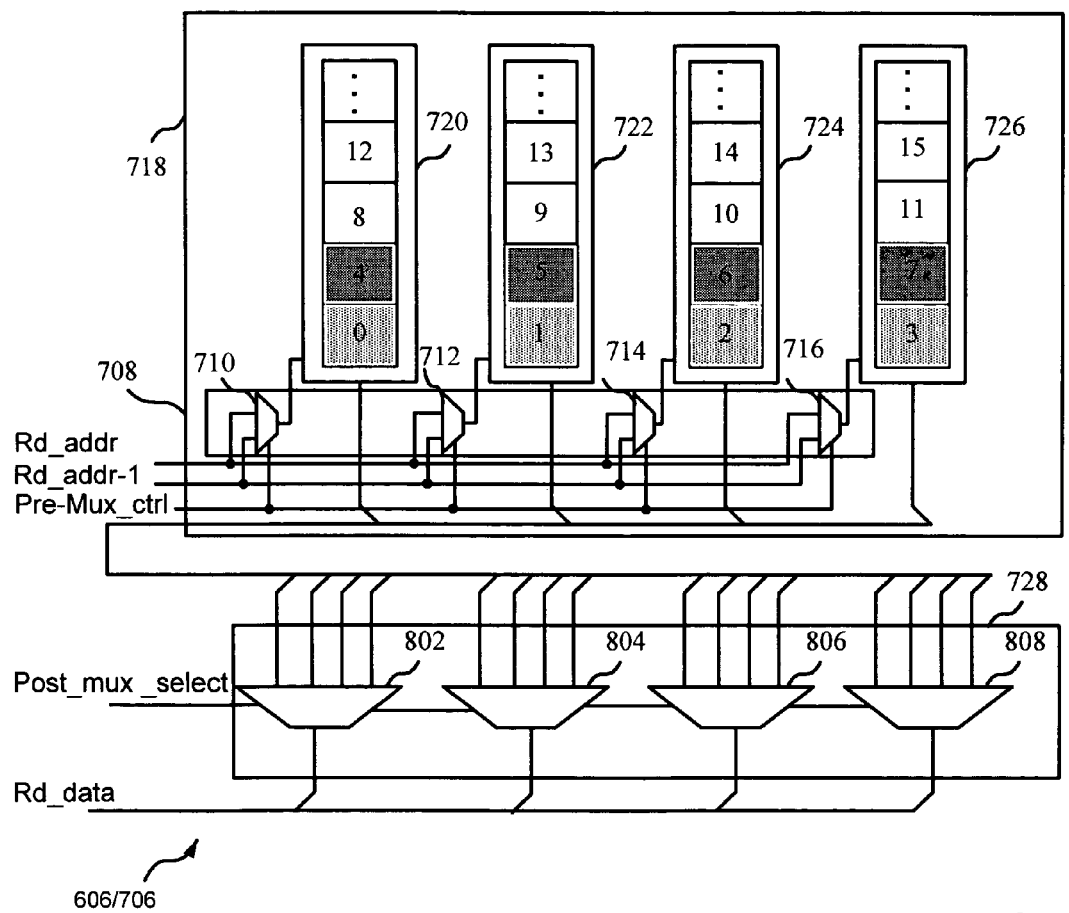
FIG. 8 is a diagram of a multiplexing network for generating the unaligned data according to an embodiment of the present invention.

Turning now to FIG. 8, a diagram of the multiplexing network for generating the unaligned data according to an embodiment of the present invention is shown. The FIFO block 718 comprises the FIFOs 720-726 that are coupled to the multiplexers 710-716 respectively to receive one of the current address (Rd_addr) or the previous address (Rd_addr−1), as determined by the Pre_mux_ctrl signal. As shown in FIG. 8, the aligned data is stored in the plurality of memory arrays, including bytes 0-3 in the first row of bytes and bytes 4-7 in the second row of bytes. Multiplexer 728 comprises a second plurality of multiplexers 802-808, each of which is coupled to receive the output of each of the memory arrays to generate an output data word comprising a byte from each of the memory arrays.

In the current example, the output word (Rd_data) would comprise four 8-bit words in a predetermined order determined by the shift case as described above. For example, for shift case=1 as shown in FIG. 5, the first word output by the multiplexer 728 would consist of byte 0 (shown in FIG. 3) elected by multiplexer 808, which would select the previous address (i.e. Rd_addr−1) for the memory array 720. The outputs of the remaining multiplexers would be disregarded. The second word output by the multiplexer would be byte 1 output by multiplexer 802. That is, assuming that the current address is the dark shaded row comprising bytes 4, 5, 6 and 7 and the previous address is the light shaded row comprising bytes 0, 1, 2, and 3, multiplexer 712 would select the previous address to select byte one of the memory array 722, while multiplexer 802 would select memory array 722 to generate the most significant byte. Similarly, multiplexer 714 would select the previous address to select byte two of the memory array 724, while multiplexer 804 would select memory array 724 to generate the second most significant byte. Multiplexer 716 would select the previous address to select byte three of the memory array 726, while multiplexer 806 would select memory array 722 to generate the third most significant byte. Finally, multiplexer 710 would select the current address to select byte zero of the memory array 720, while multiplexer 808 would select memory array 720 to generate the least significant byte. Accordingly, the multiplexers 708 and 728 enable the realigning of data according to the desired shift case.

Turning now to FIG. 9, an exemplary table shows the operation of one embodiment of the present invention. In particular, the table of FIG. 9 shows the control logic for a 32-bit wide data path system implemented in the receive data realignment state machine according to the circuits of FIGS. 6 and 7. 'Case in' represents the current state of the state machine, while the second column is the incoming byte enables (BEs). The shift case is derived by taking the binary value of 4 decimal and subtracting the case in, then truncating this down to 2 bits. For example if the case in is 0 and the BEs is 0001 then the case out would be 3 and the shift case would be 1. Also, case 0 is always the initial state of a packet and indicates that no valid bytes have been read from this packet yet. The byte enable signal indicates the number of bytes that must be unaligned. For example, when the byte enable is equal to "1111," there is no need to unalign the data. However, when the byte enable is "0001," the case out indicates that the shift case used by the state machine is shift case 1. The pre-mux column represents the selection of the current or previous addresses to the byte lane FIFO. Depending upon the case in, the pre-mux will set the address as the current or previous address for each of the byte lanes, as described above. The post mux control is the same as the shift case.

The increment address column indicates if the address to the FIFOs should be incremented. It should be noted that for any 'case in' that is not zero, the only valid 'be' combinations are for contiguous data. New packets reset the case in to 0. The increment signal is used to increment the read address pointer on the byte-lane FIFOs, and is only incremented when a full 32 bits is read or the case-in is zero. For example, if the case-in is 3 and there are 3 valid bytes in the FIFO and 1 current byte is being read in the most significant byte lane and the other byte lanes read previous data (indicated by the 0111 in pre-mux), then the FIFO would be incremented if the number of enabled BEs is greater than 1. While table 9 shows one example of a 32 bit system, table 9 may be easily expanded to accommodate any 2**n (2 to the nth power) data path systems, where n is greater than 2.

Turning now to FIG. 10, a block diagram of a programmable logic device according to an embodiment of the present invention is shown. As noted above, a programmable logic device is one type of integrated circuit that is designed to be user-programmable so that users may implement logic designs of their choices. One type of programmable logic device is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of programmable logic device is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources.

The FPGA architecture 1000 of FIG. 10 includes a large number of different programmable tiles including multi-gigabit transceivers (MGTs 1001), configurable logic blocks (CLBs 1002), random access memory blocks (BRAMs 1003), input/output blocks (IOBs 1004), configuration and clocking logic (CONFIG/CLOCKS 1005), digital signal processing blocks (DSPs 1006), specialized input/output blocks (I/O 1007) (e.g., configuration ports and clock ports), and other programmable logic 1008 such as digital clock managers, analog-to-digital converters, system monitoring logic, and so forth. Some FPGAs also include dedicated processor blocks (PROC 1010).

In some FPGAs, each programmable tile includes a programmable interconnect element (INT 1011) having standardized connections to and from a corresponding interconnect element in each adjacent tile. Therefore, the programmable interconnect elements taken together implement the programmable interconnect structure for the illustrated FPGA. The programmable interconnect element (INT 1011) also includes the connections to and from the programmable logic element within the same tile, as shown by the examples included at the top of FIG. 10.

For example, a CLB 1002 may include a configurable logic element (CLE 1012) that may be programmed to implement user logic plus a single programmable interconnect element (INT 1011). A BRAM 1003 may include a BRAM logic element (BRL 1013) in addition to one or more programmable interconnect elements. The BRAM comprises dedicated memory separate from the distributed RAM of a configuration logic block. The FIFOs 620-626 of FIG. 6 may be implemented in four BRAMs, for example. Alternatively, the BRAM 732 may be implemented in a BRAM, while the FIFOs 720-726 may be implemented in configurable logic elements, which will be described in more detail in reference to FIG. 11. Typically, the number of interconnect elements included in a tile depends on the height of the tile. In the pictured embodiment, a BRAM tile has the same height as four CLBs, but other numbers (e.g., five) may also be used. A DSP tile 1006 may include a DSP logic element (DSPL 1014) in addition to an appropriate number of programmable interconnect elements. An IOB 1004 may include, for example, two instances of an input/output logic element (IOL 1015) in addition to one instance of the programmable interconnect element (INT 1011).

In the pictured embodiment, a columnar area near the center of the die (shown shaded in FIG. 10) is used for configuration, clock, and other control logic. Horizontal areas 1009 extending from this column are used to distribute the clocks and configuration signals across the breadth of the FPGA. Some FPGAs utilizing the architecture illustrated in FIG. 10 include additional logic blocks that disrupt the regular columnar structure making up a large part of the FPGA. The additional logic blocks may be programmable blocks and/or dedicated logic. For example, the processor block PROC 1010 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic. While an FPGA is shown in detail as one type of programmable logic device by way of example, the circuits and methods of the present invention may be implemented in any device, including any type of integrated circuit having programmable logic.

Figure 11:
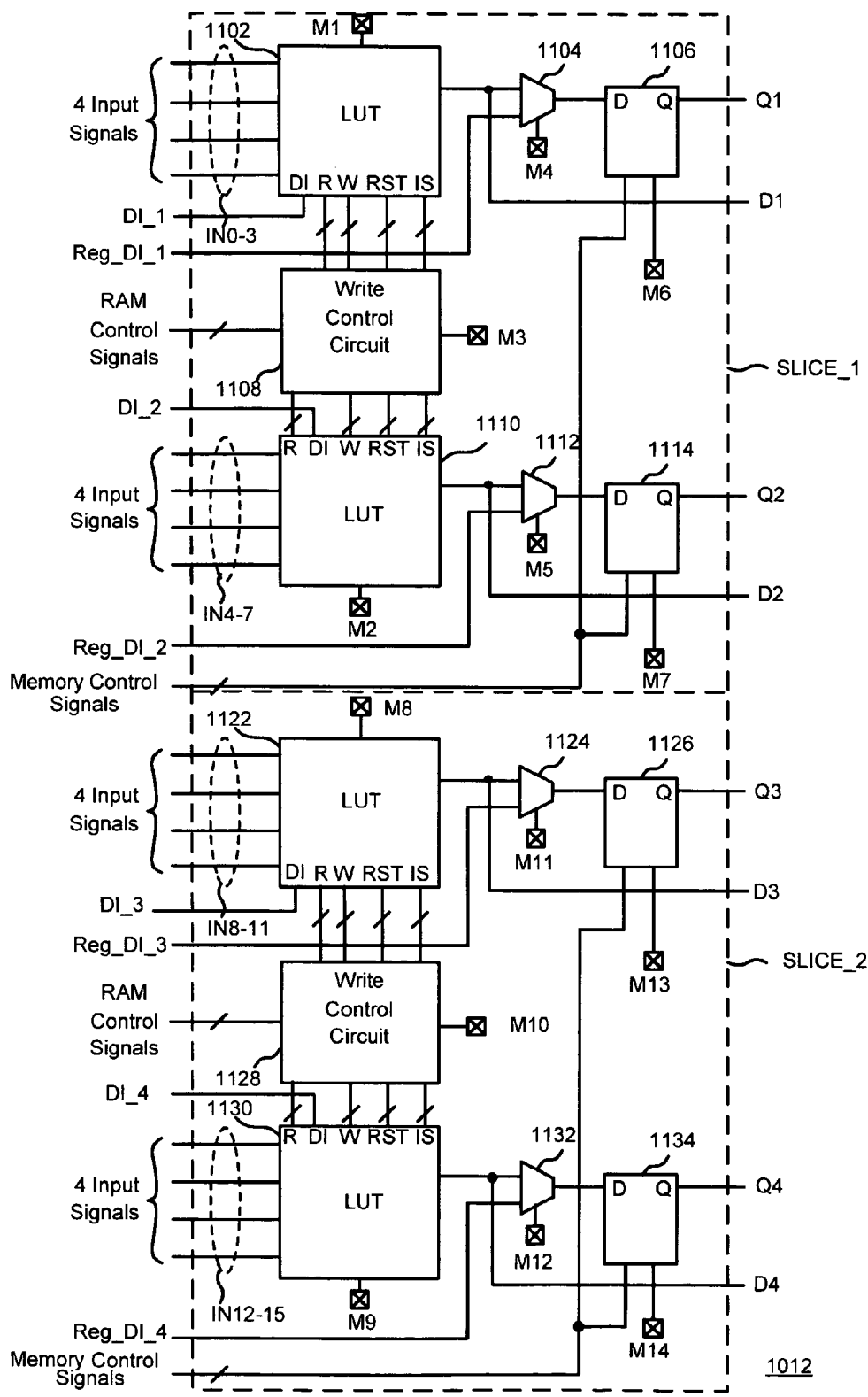
FIG. 11 is a block diagram of a configurable logic element of the programmable logic device of FIG. 10 according to an embodiment of the present invention.

Turning now to FIG. 11, a block diagram of a configurable logic element of the programmable logic device of FIG. 10 according to an embodiment of the present invention is shown. In particular, FIG. 11 illustrates in simplified form a configurable logic element of a configuration logic block 1002 of FIG. 10. The configurable logic element shown comprises two similar slices, where each slice comprises a pair of function generators. However, the configurable logic element may comprise more slices, such as four slices, for example. Each function generator may function in any of several modes depending upon the configuration data in the configuration memory elements M1-M14. The lookup table may be used as a RAM, such as a RAM for implementing the FIFOs 720-726 of FIG. 7. When in RAM mode, input data is supplied by an input terminal DI_1, DI_2 to the data input (DI) terminal of the associated function generator. Each function generator provides an output signal to an associated multiplexer, which selects between the output signal function generator and an associated register direct input signal Reg_DI_1, Reg_DI_2 from the programmable interconnect element. Thus, each function generator may be optionally bypassed. When in look-up table mode, each function generator implemented as a look-up table has four data input signals IN0-IN3. Slice 1 comprises a function generator implemented as a LUT 1102 coupled to a multiplexer 1104. In particular, the LUT 1102 receives 4 input signals which are decoded to generate an output associated with data stored in the LUT at the address designated by the input signals. The multiplexer 1104 is adapted to receive the output D1 of LUT 1102 and a registered value of Reg_DI_1. The output of the multiplexer 1104 is coupled to a register 1106 which generates an output Q1.

A Write Control Circuit 1108 is coupled to receive RAM control signals and generate signals to control the LUT 1102. In addition to a data input (DI) coupled to receive RAM_DI_1 and conventional read and write control signals coupled to a read enable input (R) and a write enable input (W), the LUT 1102 comprises a partial reset input (RST) for receiving a partial reset signal, and an initial state input (IS) for receiving an initial state signal. Such resetting of the memory elements enables resetting the LUT memory cells during a partial reconfiguration of a programmable logic device, including partial reconfiguration of a device during operation. Similarly, slice 1 comprises a function generator implemented as a LUT 1110 coupled to a multiplexer 1112. The LUT 1110 is adapted to receive input signals IN4-IN7, while the multiplexer 1112 is coupled to receive the output D2 of the LUT 1110 and a registered value of Reg_DI_2. The output of the multiplexer 1112 is coupled to a register 1014 which generates an output Q2. The write control circuit 1108 also generates a partial reset signal and an initial state signal for selectively resetting or setting one or more of the bits of the LUT 1110. One advantage of resetting LUT memory elements of a device during partial reconfiguration is that it is not necessary to cycle through the required clock cycles to set the correct data after the partial reconfiguration.

Similarly, slice 2 comprises a function generator implemented as a LUT 1122 coupled to a multiplexer 1124. The LUT 1122 is adapted to receive input signals IN8-IN11, while the multiplexer 1124 is coupled to receive the output D3 of the LUT 1122 and a registered value of Reg_DI_3. The output of the multiplexer 1124 is coupled to a register 1126 which generates an output Q3. A Write Control Circuit 1128 is coupled to receive RAM control signals and generate signals to control the LUT 1122. In particular, input signals IN8-IN11 are decoded to generate an output associated with data stored in the LUT at the address designated by the input signals. The LUT 1122 comprises a partial reset input (RST) for receiving a partial reset signal, and an initial state input (IS) for receiving an initial state signal. Similarly, slice 2 comprises a function generator implemented as a LUT 1130 coupled to a multiplexer 1132. The LUT 1130 is adapted to receive input signals IN12-IN15, while the multiplexer 732 is coupled to receive the output D4 of the LUT 1130 and a registered value of Reg_DI_4. The output of the multiplexer 1132 is coupled to a register 1134 which generates an output Q4. The write control circuit 1128 also generates a partial reset signal and an initial state signal for selectively resetting or setting one or more of the bits of the LUT 1130. Each LUT of FIG. 11 may be employed as a FIFO for a given byte lane as shown in FIG. 7, for example. Accordingly, in an embodiment of the circuit as shown in FIG. 7, only a single BRAM and one CLB would be required.

Figure 12:
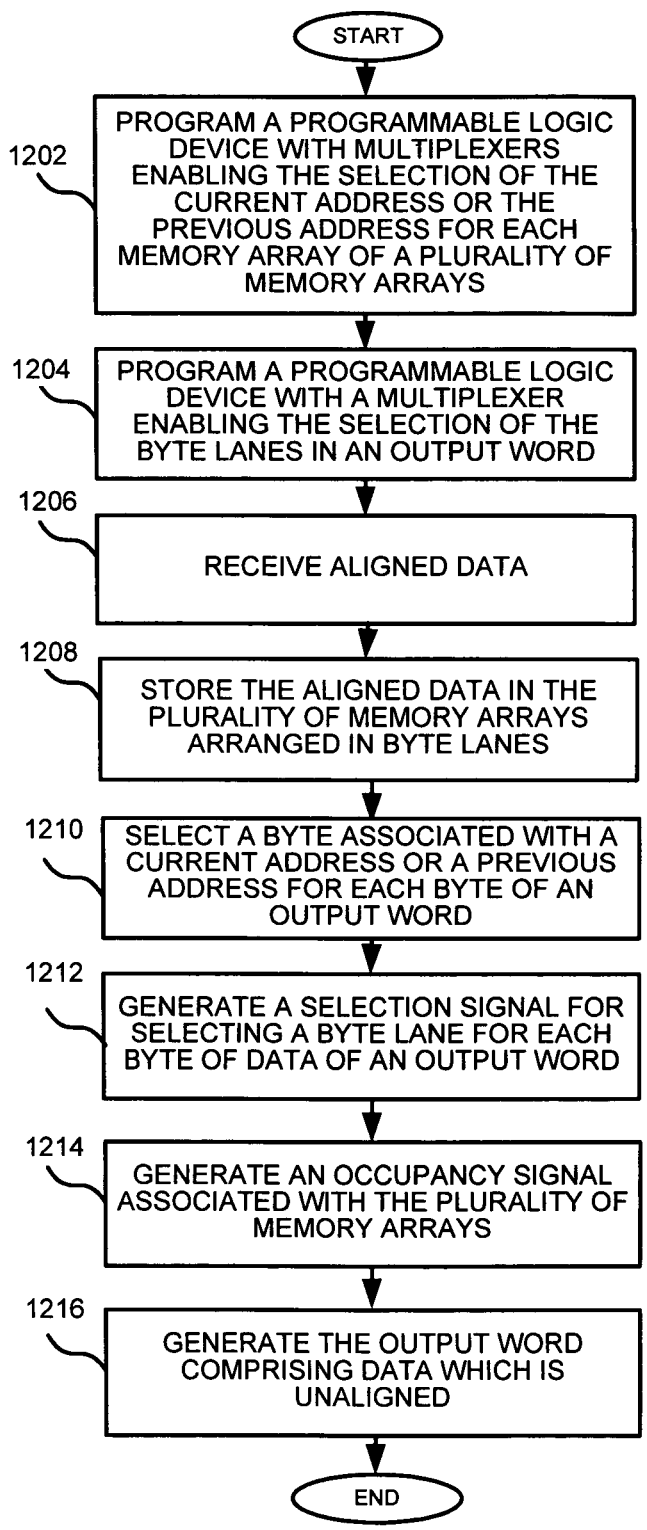
FIG. 12 is a flow chart showing a method of realigning data received at a receiver according to an embodiment of the present invention.

Turning now to FIG. 12, a flow chart shows a method of realigning data received at a receiver according to an embodiment of the present invention. The method of FIG. 12 may be implemented using any of the circuits of FIG. 1-11 as described above, or some other suitable circuit. In particular, a programmable logic device is programmed with multiplexers enabling the selection of the current address or the previous address for each memory array of a plurality of memory arrays at a step 1202. The programmable logic device is also programmed with a multiplexer enabling the selection of the byte lanes in an output word at a step 1204. Aligned data is received at a step 1206. The aligned data is stored in a plurality of memory arrays arranged in byte lanes at a step 1208. A selection signal is generated for selecting the current address or a previous address at a step 1210 for each byte of data. A byte lane is also selected for each byte of an output word at a step 1212. An occupancy signal associated with the shift register is generated at a step 1214. An output word comprising data which is unaligned is output at a step 1216.

It can therefore be appreciated that the new and novel circuit for and method of realigning data received at a receiver has been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for realigning data received at a receiver, the circuit comprising:
    a plurality of memory arrays, each memory array having a predetermined data width;
    a plurality of multiplexers responsive to selection signals associated with a shift value, wherein each multiplexer is coupled to select an address comprising a current address or a previous address for data to be output by a memory array of the plurality of memory arrays based upon the shift value indicating data of the previous address which is to be simultaneously output with data of the current address;
    an output multiplexer coupled to select an order of the outputs of the plurality of memory arrays as a single output word based upon the selected addresses, wherein the outputs of the plurality of memory arrays are provided in an order based upon the shift value; and
    a memory control circuit coupled to the plurality of multiplexers and the output multiplexer, the memory control circuit coupling select signals to the plurality of multiplexers and the output multiplexer to enable generating realigned data comprising the outputs of the predetermined data width from each memory array of the plurality of memory arrays.

2. The circuit of claim 1, wherein each multiplexer of the plurality of multiplexers receives the current address and the previous address.

3. The circuit of claim 1, wherein each memory array of the plurality of memory arrays comprises a byte lane.

4. The circuit of claim 3, wherein the output multiplexer is coupled to each byte lane to output a word comprising a byte from each byte lane.

5. The circuit of claim 1, further comprising a random access memory storing aligned data to be transferred to the plurality of memory arrays and output as realigned data.

6. The circuit of claim 5, wherein each memory array of the plurality of memory arrays comprises a shift register of a programmable logic device.

7. The circuit of claim 6, further comprising an address control circuit coupling the current address and the previous address to the plurality of multiplexers.

8. A circuit for realigning data received at a receiver, the circuit comprising:
    a first memory array storing an aligned data stream;
    a plurality of memory arrays coupled to the first memory array, wherein each memory array of the plurality of memory arrays has a predetermined data width and comprises a shift register and is coupled to receive a current address or a previous address;
    a plurality of multiplexers responsive to selection signals associated with a shift value, wherein each multiplexer is coupled to select between the current address and the previous address for data to be output by a memory array of the plurality of memory arrays based upon the shift value, wherein the shift value indicates data of the previous address which is simultaneously output with data of the current address;
    an output multiplexer coupled to select an order of data to be output by the plurality of memory arrays as a single output word based upon the selected addresses, wherein the outputs of the plurality of memory arrays are provided in an order based upon the shift value; and
    a memory control circuit coupled to the plurality of multiplexers and the output multiplexer, the memory control circuit coupling select signals to the plurality of multiplexers and the output multiplexer to enable generating an output comprising realigned data of the aligned data stream comprising the outputs of the predetermined data width from each memory array of the plurality of memory arrays.

9. The circuit of claim 8, wherein the circuit comprises a programmable logic device.

10. The circuit of claim 8, wherein each memory array of the plurality of memory arrays comprises a shift register of a programmable logic device.

11. The circuit of claim 10, wherein the first memory array comprises a random access memory of the programmable logic device.

12. The circuit of claim 8, further comprising an address controller coupled to receive an increment signal and generate the current address and the previous address.

13. The circuit of claim 8, further comprising a control circuit controlling the writing of data from the first memory array to the plurality of memory arrays.

14. The circuit of claim 8, wherein each memory array of the plurality of memory arrays stores data associated with a byte lane.

15. A method of realigning data received at a receiver, the method comprising:
receiving aligned data;
storing the aligned data in a plurality of memory arrays corresponding to a plurality of byte lanes, each byte lane having a byte of data for a current address and a byte of data for a previous address;
determining a shift value for the data, wherein the shift value indicates data of the previous address which is to be simultaneously output with data of the current address;
selecting a byte of data between a first byte associated with the current address and a second byte associated with the previous address for each byte lane based upon the shift value;
selecting a byte lane for each byte of a single output word based upon the shift value; and
generating the single output word comprising unaligned data, wherein the single output word comprises a byte of data associated with a current address or a previous address from each byte lane.

16. The method of claim 15, further comprising generating a selection signal for selecting between the first byte and the second byte for each byte lane.

17. The method of claim 15, wherein storing data in a plurality of memory arrays comprises storing data in a plurality of shift registers of a programmable logic device.

18. The method of claim 17, further comprising generating an occupancy signal associated with the plurality of shift registers.

19. The method of claim 15, wherein selecting between a first byte associated with the current address and a second byte associated with the previous address for each byte lane comprises programming a programmable logic device with a plurality of multiplexers enabling the selection between the first byte and the second byte for each byte lane.

20. The method of claim 19, wherein selecting a byte lane for each byte of a single output word comprises programming a programmable logic device with a multiplexer enabling the selection of a byte lane for each byte of the single output word.

* * * * *